(12) United States Patent
Kuo et al.

(10) Patent No.: US 8,894,737 B2
(45) Date of Patent: Nov. 25, 2014

(54) SUSPENDED NUTRITION COMPOSITION AND MANUFACTURING METHOD THEREOF

(71) Applicant: Chunghwa Picture Tubes, Ltd., Taoyuan (TW)

(72) Inventors: Chou-Chiang Kuo, New Taipei (TW); Tso-Hsuan Yeh, Taoyuan County (TW); Che-Wei Chang, Taoyuan County (TW)

(73) Assignee: Chunghwa Picture Tubes, Ltd., Taoyuan County (TW)

( * ) Notice: Subject to any disclaimer, the term of this patent is extended or adjusted under 35 U.S.C. 154(b) by 136 days.

(21) Appl. No.: 13/688,147

(22) Filed: Nov. 28, 2012

(65) Prior Publication Data
US 2014/0083148 A1    Mar. 27, 2014

(30) Foreign Application Priority Data
Sep. 25, 2012 (TW) .............................. 101135148 A

(51) Int. Cl.
| | |
|---|---|
| C05D 9/02 | (2006.01) |
| C05F 11/00 | (2006.01) |
| A01N 25/00 | (2006.01) |
| C05G 3/00 | (2006.01) |
| C08J 9/00 | (2006.01) |

(52) U.S. Cl.
CPC ............ *C05G 3/0052* (2013.01); *C05G 3/0011* (2013.01); *C08J 2201/03* (2013.01); *C08J 9/0014* (2013.01); *C05G 3/00* (2013.01); *C08J 2403/00* (2013.01); *C05G 3/0082* (2013.01); *C08J 9/0061* (2013.01)

USPC .................. 71/27; 71/11; 71/64.02; 71/64.07; 71/64.08

(58) Field of Classification Search
CPC ....... C05G 3/00; C05G 3/0011; C05G 3/0052; C05G 3/0082; C08J 9/0014; C08J 9/0061; C08J 2403/00; C08J 2201/03
See application file for complete search history.

(56) References Cited

U.S. PATENT DOCUMENTS

| | | | |
|---|---|---|---|
| 5,801,207 A * | 9/1998 | Bastioli et al. ................ 521/84.1 |
| 6,184,261 B1 * | 2/2001 | Biby et al. .................... 521/84.1 |
| 2014/0041430 A1 * | 2/2014 | Kuo et al. ........................ 71/15 |
| 2014/0083148 A1 * | 3/2014 | Kuo et al. ........................ 71/23 |

FOREIGN PATENT DOCUMENTS

| | | |
|---|---|---|
| CN | 1247451 | 3/2000 |
| TW | 262458 | 11/1995 |
| WO | 95/17815 | 7/1995 |

OTHER PUBLICATIONS

"Office Action of Taiwan Counterpart Application", issued on May 16, 2014, p. 1-p. 4.

* cited by examiner

*Primary Examiner* — Jennifer A Smith
(74) *Attorney, Agent, or Firm* — Jianq Chyun IP Office

(57) ABSTRACT

A suspended nutrition composition includes a foamed material, a colloid layer and a nutrient. The foamed material having a plurality of pores includes a starch, a biodegradable polyester and a plasticizer. The pores are formed by bubbles produced from a physical foaming agent. The colloid layer covers a surface of the foamed material. The nutrient is dispersed in the foamed material.

6 Claims, 2 Drawing Sheets

US 8,894,737 B2

SUSPENDED NUTRITION COMPOSITION AND MANUFACTURING METHOD THEREOF

CROSS-REFERENCE TO RELATED APPLICATION

This application claims the priority benefit of Taiwan application Ser. No. 101135148, filed on Sep. 25, 2012. The entirety of the above-mentioned patent application is hereby incorporated by reference herein and made a part of this specification.

BACKGROUND OF THE INVENTION

1. Field of the Invention

The invention relates to a nutrition composition and a manufacturing method thereof, and more particularly, to a suspended nutrition composition and a manufacturing method thereof.

2. Description of Related Art

Plant factory is recognized as the highest development stage of facility agriculture internationally. The plant factory is a highly technology-intensive production method not or barely limited by natural conditions, and has merits such as no use of pesticides, effort saving operation, and high degree of automation. A yield per unit area of the plant factory reaches as high as tens of times or even hundreds of times that of common land farming, and thus is viewed as an important way of resolving problems connected with population, resource and environment. A core value of the plant factory is to assist in enhancement and refinement of agriculture, to reduce destruction of the environment and to increase control over quality.

A main technique of the plant factory lies in a combination of hydroponics, environmental control and biotechnology, wherein hydroponics makes it possible that a crop grows without soil, thus avoiding defects such as loss of soil fertility and obstacles to continuous cropping. Specifically, hydroponics is to provide nutrients for a plant to absorb and grow, via a nutrient liquid, thereby achieving a goal of soilless cultivation. In addition, an advantage of hydroponics is ease of automation. Moreover, the nutrient liquid may be recycled for use, and is easy to monitor at any time.

Generally, the nutrient liquid includes water and a nutrient. A motor is often used to circulate the nutrient liquid to enable the nutrient to be dispersed uniformly in the water. However, the motor consumes too much electrical energy, thus increasing the cost of automatic control in hydroponics.

SUMMARY OF THE INVENTION

The invention provides a suspended nutrition composition which releases a nutrient by being suspended on a water surface so as to increase an entire uniformity of the nutrient in the water, thus saving electrical energy.

The invention proposes a suspended nutrition composition including a foamed material, a colloid layer and a nutrient. The foamed material having a plurality of pores includes a starch, a biodegradable polyester and a plasticizer, wherein the pores are formed by bubbles produced from a physical foaming agent. The colloid layer covers a surface of the foamed material. The nutrient is dispersed in the foamed material.

The invention also proposes a manufacturing method of a suspended nutrition composition including the following steps. First, a starch, a biodegradable polyester, a plasticizer and a physical foaming agent are mixed together to form a first mixture. Then, a nutrient is added to the first mixture to form a second mixture. Next, a hot extrusion process is performed so that the physical foaming agent produces bubbles to form at least a foamed material having a plurality of pores. After that, a coating process is performed so that a colloid solution covers a surface of the foamed material.

Based on the above, the suspended nutrition composition of the invention covers the foamed material with the colloid layer to control a release rate of the nutrient and a concentration of the nutrient in the water. In addition, the suspended nutrition composition of the invention is suspended on the water surface so that the nutrient is dispersed uniformly into the water.

To make the aforementioned features and advantages of the invention more comprehensible, embodiments accompanied with figures are described in detail below.

DESCRIPTION OF EMBODIMENTS

Figure 1:
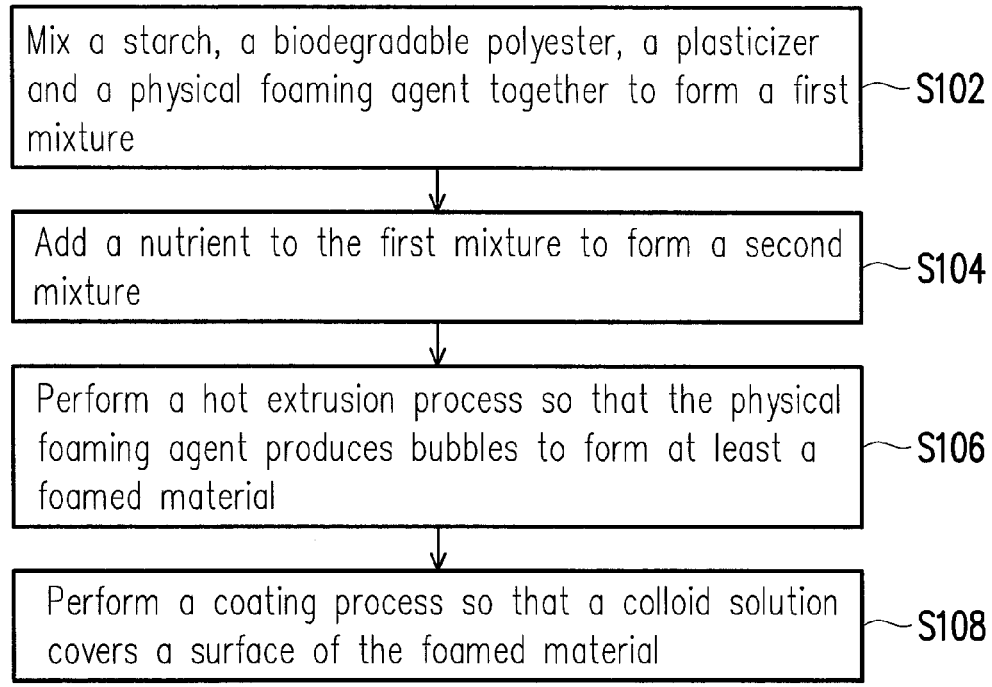
FIG. 1 is a schematic diagram of a manufacturing process of a suspended nutrition composition according to an embodiment of the invention.
Figure 2:
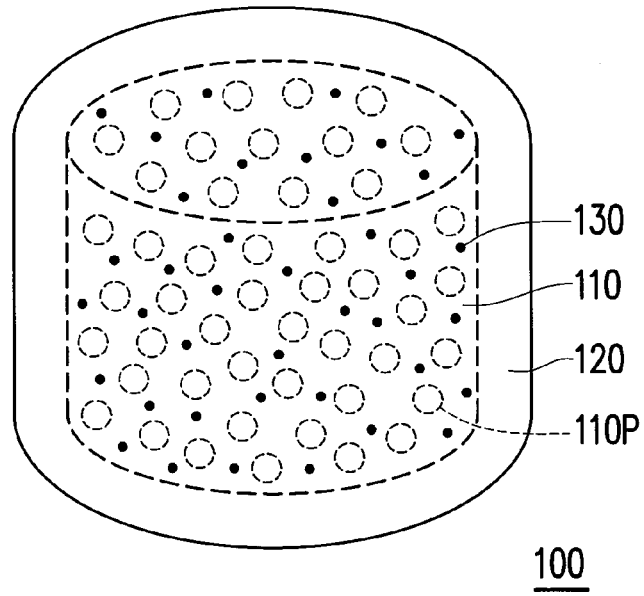
FIG. 2 is a schematic diagram of a structure of a suspended nutrition composition according to an embodiment of the invention.

FIG. 1 is a schematic diagram of a manufacturing process of a suspended nutrition composition according to an embodiment of the invention. FIG. 2 is a schematic diagram of a structure of a suspended nutrition composition according to an embodiment of the invention. Referring to FIG. 1, first, step S102 is performed. A starch, a biodegradable polyester, a plasticizer and a physical foaming agent are mixed together to form a first mixture. Based on a total weight of the first mixture, the content of the starch is 65 wt % to 75 wt %, the content of the biodegradable polyester is 15 wt % to 25 wt %, the content of the plasticizer is 8 wt % to 13 wt %, and the content of the physical foaming agent is 0.5 wt % to 5 wt %.

The starch is used for absorbing a water solution. The starch is, for example, corn starch, cassava, potato or other suitable starch. Of course, the invention is not limited thereto. Any common edible starch may be employed as the starch in the present embodiment.

The biodegradable polyester is used for strengthening mechanical properties. The biodegradable polyester is, for example, a poly(butylene succinate) (PBS) or a poly lactic acid (PLA). Of course, the invention is not limited thereto. Any polyester that is biodegradable may be employed as the biodegradable polyester in the present embodiment.

The plasticizer is used for processing and shaping purposes. The plasticizer is, for example, a mixture of glycerol and water or a polyalcohol. Of course, the invention is not limited thereto. Any plasticizer that is biodegradable may be employed as the plasticizer in the present embodiment.

The physical foaming agent is used for producing gas pores. The physical foaming agent is, for example, urea ($CO(NH_2)_2$), sodium hydrogen carbonate ($NaHCO_3$), ammonium bicarbonate ($NH_4HCO_3$) or calcium carbonate ($CaCO_3$). The above-mentioned physical foaming agents, all of which produce carbon dioxide after being heated, are selected for exemplary purposes. Of course, the invention is not limited thereto.

In other embodiments, any foaming agent that produces gas after being heated may be employed as the physical foaming agent as in the present embodiment.

Next, step S104 is performed. A nutrient is added to the first mixture to form a second mixture. The nutrient is, for example, a fertilizer. The type of the fertilizer depends upon a crop desired to be planted. In other words, the invention does not limit the type of the nutrient. Specifically, the type of the nutrient is determined according to the type of an element desired to be added. The fertilizer is, for example, a nitrogen fertilizer, a boron fertilizer, a phosphate fertilizer, a potassium fertilizer or a calcium fertilizer. Furthermore, a content ratio of the nutrient is determined depending upon different types of fertilizers. Generally speaking, a concentration of the nitrogen fertilizer in a nutrient liquid is 120 ppm to 300 ppm, a concentration of the potassium fertilizer in a nutrient liquid is 40 ppm to 150 ppm, a concentration of the calcium fertilizer in a nutrient liquid is 100 ppm to 260 ppm. The exact concentration of the fertilizer may be adjusted due to difference between crops. In the present embodiment, the content of the nutrient in the second mixture is, for example, 3 to 10 times the concentration of the fertilizer in the nutrient liquid.

In the present embodiment, the nutrient is, for example, a first type fertilizer. The first type fertilizer is, for example, potassium hydrogen phosphate ($KH_2PO_4$), magnesium sulfate ($MgSO_4 \cdot 7H_2O$), manganese sulfate ($MnSO_4 \cdot 4H_2O$), boric acid ($H_3BO_3$), sodium tetraborate ($Na_2B_4O_7 \cdot 10H_2O$), copper sulfate ($CuSO_4 \cdot 5H_2O$), zinc sulfate ($ZnSO_4 \cdot 7H_2O$), ammonium heptamolybdate (($NH_4)_6Mo_7O_{24} \cdot 4H_2O$), urea ($CO(NH_2)_2$) or any combination thereof. In another embodiment, the nutrient is, for example, a second type fertilizer. The second type fertilizer is, for example, calcium nitrate ($Ca(NO_3)_2 \cdot 4H_2O$), calcium chloride ($CaCl_2$), ferric -ethylenediaminetetraacetic acid (Fe-EDTA), potassium nitrate ($KNO_3$) or any combination thereof.

Next, step S106 is performed. A hot extrusion process is performed to the second mixture so that the physical foaming agent in the second mixture produces bubbles to form at least a foamed material 110 having a plurality of pores 110P, as shown in FIG. 2. The physical foaming agent may consist of different ratios of urea, sodium hydrogen carbonate, ammonium bicarbonate and calcium carbonate. The physical foaming agent produces carbon dioxide after being heated, and the carbon dioxide remains in the second mixture to form the foamed material 110 having the plurality of pores 110P.

Specifically, the hot extrusion process is, for example, to guide the second mixture into a single-screw extruder for processing. The processing condition is, for example, a four-stage heating process. The first stage is, for example, a preheating and conveying stage, and a temperature thereof is 110° C. to 115° C. The second stage is, for example, a melting and mixing stage, and a temperature thereof is 125° C. to 130° C. The third stage is, for example, an extruding and blending stage, and a temperature thereof is 125° C. to 130° C. The fourth stage is, for example, a cooling and outputting stage, and a temperature thereof is 105° C. to 110° C. In addition, a rotational speed of the screw is, for example, 40 rpm to 50 rpm. In other words, the hot extrusion process is, for example, to extrude the second mixture simultaneously while heating the second mixture so that the second mixture forms the foamed material having a bar shape. However, the invention does not limit the shape of the foamed material.

Next, a cutting process is selectively performed. The bar-shaped foamed material 110 is cut into a plurality of foamed pellets. Moreover, the invention does not limit the shape of the foamed pellet. In other words, the foamed material 110 may be a pellet of any shape.

Next, a low temperature curing process is selectively performed to fix the shape of the foamed material. Here, the curing process is performed at a temperature of −20° C., for example.

Then, step S108 is performed. That is, a coating process is performed so that a colloid solution covers a surface of the foamed material 110. The steps of the coating process include: first, a colloid powder is mixed uniformly with a liquid at 25° C. to 30° C., and then stirred slowly with a heating and dissolving process being performed to form the colloid solution, wherein the content of the colloid powder is 1.5 wt % to 51 wt %. Here, the liquid is, for example, water. The heating and dissolving process is performed at a temperature in a range of 60° C. to 80° C. In the present embodiment, the colloid is, for example, a natural biocolloid or a chemosynthetic colloid. The natural biocolloid is, for example, agar, xanthan gum, shellac, guar gum, gamma-polyglutamic acid, pectin or sodium alginate. In addition, the chemosynthetic colloid is, for example, a synthetic hydrogel such as poly(lactic-co-glycolic acid) (PLGA).

In the present embodiment, the colloid solution consists of the colloid powder and the liquid. However, the invention is not limited thereto. In another embodiment, to conduce to a release of the nutrient 130 from the foamed material 110, the nutrient 130 is added to the mixed colloid powder and liquid after the heating and dissolving process. Here, the content of the nutrient 130 dispersed in the foamed material 110 is, for example, greater than the content of the nutrient 130 dispersed in the colloid solution.

Then, the colloid solution is coated on a surface of the cured foamed material 110. For example, the cured foamed material 110 is injected into the colloid solution, and then the foamed material having the colloid solution covering a surface thereof is taken out.

After the coating process is performed, a low temperature curing process is selectively performed to the foamed material 110 covered by the colloid solution so that the colloid solution forms a solid state colloid layer 120 covering the foamed material 110 therein. Up to this point, the manufacture of the suspended nutrition composition 100 of the present embodiment is completed. Following the above, the suspended nutrition composition 100 of the present embodiment is easy to manufacture, thus having advantages of ease of processing and mass production as well as low manufacturing cost.

In terms of structure, referring to FIG. 2, the suspended nutrition composition 100 of the present embodiment includes the foamed material 110, the colloid layer 120, the physical foaming agent and the nutrient 130, wherein the colloid layer 120 covers the surface of the foamed material 110. The foamed material 110 has the plurality of pores 110P. The nutrient 130 is dispersed in the foamed material 110. The composition of the foamed material 110 may be obtained by referring to the previous embodiment, and will not be described repeatedly.

When the suspended nutrition composition 100 is disposed in the water, the water permeates into the suspended nutrition composition 100, and the nutrient 130 in the suspended nutrition composition 100 is dispersed slowly from the suspended nutrition composition 100 into the water due to an influence of a concentration gradient. For example, the nutrient 130 is dispersed from the foamed material 110, through the colloid layer 120, and into the water. Here, a release rate of the nutrient 130 into the water is controlled based on a content of the nutrient 130 in the suspended nutrition composition 100.

Accordingly, the suspended nutrition composition 100 of the present embodiment releases the nutrient 130 slowly and uniformly into the water.

In the present embodiment, the suspended nutrition composition 100 has a density of less than or equal to 1 g/cm$^3$. Preferably, the suspended nutrition composition 100 has a density of, for example, less than 1 g/cm$^3$. Accordingly, the suspended nutrition composition 100 is suspended on a water surface. Here, the nutrient 130 is dispersed uniformly into the water so that a concentration of the nutrient 130 is uniform in the water.

In addition, when the concentration of the nutrient 130 in the suspended nutrition composition 100 is substantially the same as the concentration of the nutrient 130 in the water, the nutrient 130 in the suspended nutrition composition 100 will no longer be released into the water. Here, since the foamed material 110 in the suspended nutrition composition 100 consists of biodegradable material, the suspended nutrition composition 100 may be directly buried in an arable land to be degraded by microorganisms in the soil. Accordingly, environmental pollution is not easily caused, and further, soil fertility of the arable land is increased.

Figure 3:
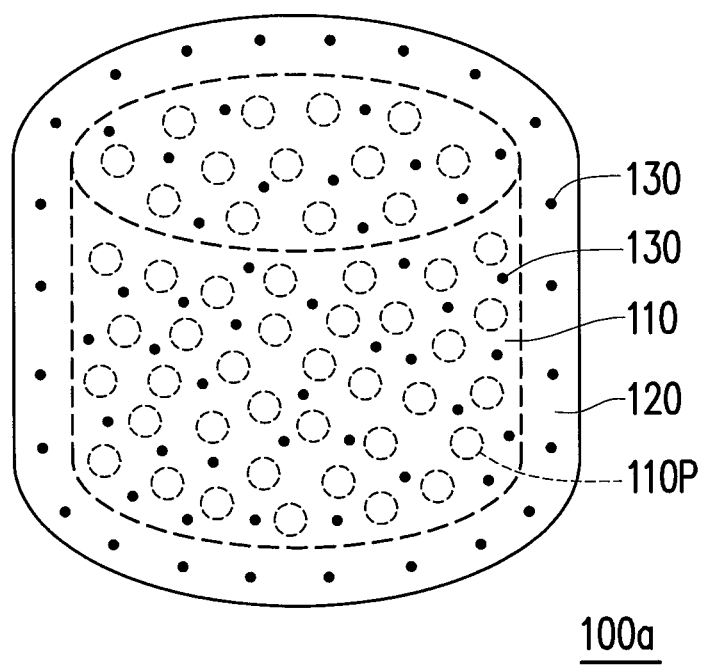
FIG. 3 is a schematic diagram of a structure of a suspended nutrition composition according to another embodiment of the invention.

In addition, in other embodiments, the nutrient 130 is dispersed in both the foamed material 110 and the colloid layer 120, as shown in FIG. 3. In the present embodiment, the content of the nutrient 130 dispersed in the foamed material 110 is greater than the content of the nutrient 130 dispersed in the colloid solution 120. When a suspended nutrition composition 100a is disposed in the water, the nutrient 130 in the colloid layer 120 is released into the water faster than the nutrient 130 in the foamed material 110, so as to further shorten the time for the nutrient 130 to be released into the water. Specifically, the suspended nutrition composition 100a of the present embodiment makes it possible that the nutrient 130 is dispersed uniformly in a nutrient liquid without using a motor to circulate the nutrient liquid. Based on the above, using the suspended nutrition composition 100a of the present embodiment enjoys advantages of electrical energy saving and lowered cultivation cost.

In summary, the suspended nutrition composition of the invention covers the foamed material with the colloid layer so that the nutrient in the foamed material is released slowly in the water to control the concentration of the nutrient in the water and the release rate of the nutrient. In addition, the suspended nutrition composition of the invention is suspended on the water surface. Thus when the nutrient is dispersed in the water, the nutrient is dispersed from top to bottom and uniformly into the water, thereby allowing a plant to absorb the nutrient continuously. In addition, the suspended nutrition composition of the invention consists of biodegradable components and thus may be directly buried in the soil after use, thereby reducing environmental pollution. Furthermore, the manufacturing method of the suspended nutrition composition of the invention has characteristics of low manufacturing cost as well as ease of processing and mass production.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A manufacturing method of a suspended nutrition composition, comprising the following steps:

mixing a starch, a biodegradable polyester, a plasticizer and a physical foaming agent together to form a first mixture;

adding a nutrient to the first mixture to form a second mixture;

performing a hot extrusion process so that the physical foaming agent produces bubbles to form at least a foamed material having a plurality of pores performing a coating process so that a colloid solution covers a surface of the foamed material; and performing a low temperature curing process to the foamed material covered by the colloid solution after performing the coating process.

2. The manufacturing method of the suspended nutrition composition as recited in claim 1, wherein the content of the starch is 65 wt % to 75 wt %, the content of the biodegradable polyester is 15 wt % to 25 wt %, the content of the plasticizer is 8 wt % to 13 wt %, and the content of the physical foaming agent is 0.5 wt % to 5 wt %, which are based on a total weight of the first mixture.

3. The manufacturing method of the suspended nutrition composition as recited in claim 1, further comprising:

performing a low temperature curing process to the foamed material before performing the coating process.

4. The manufacturing method of the suspended nutrition composition as recited in claim 1, wherein the steps of manufacturing the colloid solution comprise:

mixing a colloid powder with a liquid; and performing a heating and dissolving process to the mixed colloid powder and liquid to form the colloid solution.

5. The manufacturing method of the suspended nutrition composition as recited in claim 4, further comprising:

adding the nutrient to the mixed colloid powder and liquid after the heating and dissolving process to form the colloid solution.

6. The manufacturing method of the suspended nutrition composition as recited in claim 4, wherein the content of the colloid powder is 1.5 wt % to 51 wt % based on a total weight of the colloid solution.

* * * * *